United States Patent
Johnson et al.

(10) Patent No.: US 10,860,357 B1
(45) Date of Patent: Dec. 8, 2020

(54) SECURE RECONFIGURING PROGRAMMABLE HARDWARE WITH HOST LOGIC COMPRISING A STATIC PORTION AND A RECONFIGURABLE PORTION

(71) Applicant: Amazon Technologies, Inc., Seattle, WA (US)

(72) Inventors: Robert Michael Johnson, Austin, TX (US); Asif Khan, Cedar Park, TX (US); Nafea Bshara, San Jose, CA (US); Kiran Kalkunte Seshadri, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 177 days.

(21) Appl. No.: 15/645,624

(22) Filed: Jul. 10, 2017

Related U.S. Application Data

(60) Provisional application No. 62/486,857, filed on Apr. 18, 2017.

(51) Int. Cl.
 *G06F 9/455* (2018.01)
 *G06F 13/40* (2006.01)
 *G06F 13/42* (2006.01)

(52) U.S. Cl.
 CPC ...... *G06F 9/45558* (2013.01); *G06F 13/4068* (2013.01); *G06F 13/4282* (2013.01); *G06F 9/45541* (2013.01); *G06F 9/45545* (2013.01); *G06F 2009/45575* (2013.01); *G06F 2213/0026* (2013.01)

(58) Field of Classification Search
 None
 See application file for complete search history.

(56) References Cited

U.S. PATENT DOCUMENTS

| | | | |
|---|---|---|---|
| 8,145,894 B1 * | 3/2012 | Casselman | G06F 15/7871 713/1 |
| 2010/0312982 A1 | 12/2010 | Ichikawa et al. | |
| 2012/0005473 A1 * | 1/2012 | Hofstee | G06F 15/7867 713/100 |

(Continued)

OTHER PUBLICATIONS

U.S. Appl. No. 15/840,807, filed Dec. 13, 2017, Titled: Reconfiguring Programmable Hardware When a Virtual Machine is Active.

*Primary Examiner* — Meng Al T An
*Assistant Examiner* — Zujia Xu
(74) *Attorney, Agent, or Firm* — Kilpatrick Townsend & Stockton LLP

(57) ABSTRACT

A multi-tenant environment is described with a configurable hardware logic platform (e.g., a Field Programmable Gate Array (FPGA)) positioned on a host server computer. The configurable hardware logic platform can be programmed with a host logic wrapper portion, which is controlled by a service provider, and a customer portion, which is programmed with logic provided by a tenant of the service provider. While the host logic wrapper portion is reprogrammed, protections are put in place to prevent a virtual machine or the customer logic from violating security built within the host logic wrapper portion. Such protections can be suspending communications between the virtual machine and the customer logic until the host logic wrapper is reprogrammed.

26 Claims, 7 Drawing Sheets

(56) References Cited

U.S. PATENT DOCUMENTS

| | | | |
|---|---|---|---|
| 2013/0167028 A1* | 6/2013 | Goldman | H04N 21/4425 715/716 |
| 2014/0007230 A1* | 1/2014 | Jani | G06F 21/00 726/22 |
| 2015/0205629 A1 | 7/2015 | Kruglick | |
| 2016/0172027 A1* | 6/2016 | Tahmasebian | G11C 13/0016 257/40 |
| 2016/0321113 A1* | 11/2016 | Pinto | G06F 9/45533 |
| 2018/0074987 A1* | 3/2018 | Alley | G06F 13/382 |
| 2018/0081701 A1 | 3/2018 | Chan et al. | |
| 2018/0205553 A1* | 7/2018 | Hoppert | H04L 9/3247 |
| 2018/0295192 A1 | 10/2018 | Dutta et al. | |

\* cited by examiner

US 10,860,357 B1

SECURE RECONFIGURING PROGRAMMABLE HARDWARE WITH HOST LOGIC COMPRISING A STATIC PORTION AND A RECONFIGURABLE PORTION

CROSS-REFERENCE TO RELATED APPLICATION

This application claims priority from U.S. Provisional Application No. 62/486,857, filed Apr. 18, 2017, which application is incorporated herein by reference in its entirety.

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

The users of large computer systems may have diverse computing requirements resulting from different use cases. A compute service provider can include various different computer systems having different types of components with varying levels of performance and/or functionality. Thus, a user can select a computer system that can potentially be more efficient at executing a particular task. For example, the compute service provider can provide systems with varying combinations of processing performance, memory performance, storage capacity or performance, and networking capacity or performance. However, some users may desire to use hardware that is proprietary or highly specialized for executing their computing tasks. Thus, the compute service provider can be challenged to provide specialized computing hardware for these users while keeping a mix of generalized resources so that the resources can be efficiently allocated among the different users.

DETAILED DESCRIPTION

Figure 1:
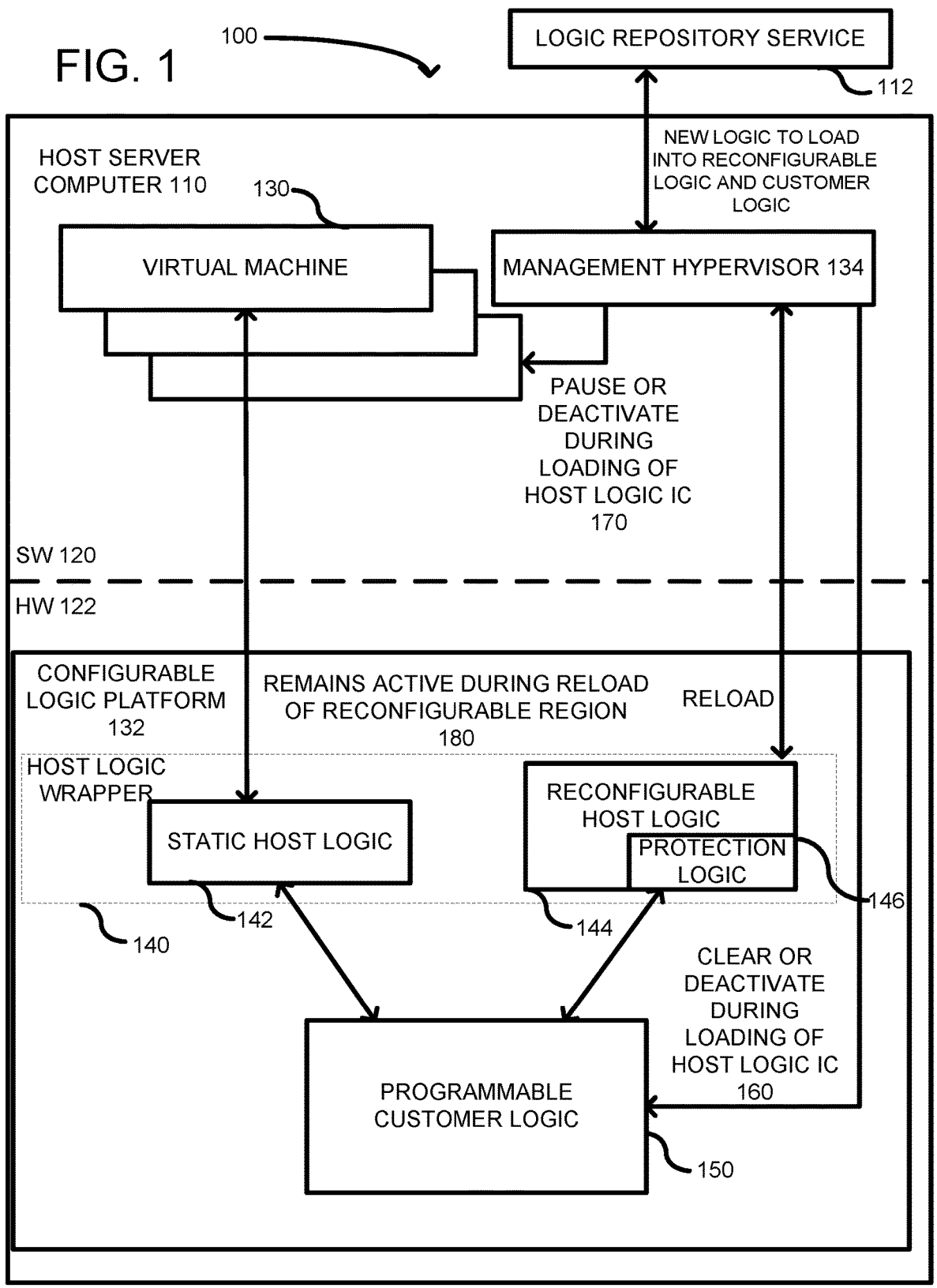
FIG. 1 is an example system diagram wherein a host logic Integrated Circuit (IC) (also called configurable logic platform), which is programmable hardware, is reconfigured with new customer logic.

A multi-tenant environment is described with a configurable hardware logic platform (e.g., a Field Programmable Gate Array (FPGA)) positioned on a host server computer. The configurable hardware logic platform can be programmed with a host logic wrapper portion, which is controlled by a service provider, and a customer portion, which is programmed with logic provided by a tenant of the service provider. While the host logic wrapper portion is reprogrammed, protections are put in place to prevent a virtual machine or the customer logic from evading protections built within the host logic wrapper portion. Such protections can include suspending communications between the virtual machine and the customer logic until the host logic wrapper is reprogrammed. The customer logic can also be reprogrammed after the host logic wrapper portion is reprogrammed or the customer logic can remain unchanged.

Configurable logic, such as an FPGA, can be programmed by customers (e.g., users) and then reused by other customers. Thus, one solution for providing specialized computing resources within a set of reusable general computing resources is to provide a server computer comprising a configurable logic platform (such as by providing a server computer with an add-in card including one or more FPGAs) as a choice among the general computing resources. Configurable logic is hardware that can be programmed or configured to perform a logic function that is specified by configuration data that is applied to or loaded on the configurable logic. For example, a user of the computing resources can provide a specification (such as source code written in a hardware description language) for configuring the configurable logic, the configurable logic can be configured according to the specification, and the configured logic can be used to perform a task for the user. However, allowing a user access to low-level hardware of the computing facility can potentially introduce security and privacy issues within the computing facility. As a specific example, during typical operation of the configurable logic, host logic for the configurable logic includes protection logic, which provides device management and security functions. While the reconfigurable host logic is being changed, (e.g., when the configurable logic is being reprogrammed for a different user), the protection logic is not available, and a virtual machine and/or customer logic within the configurable logic could potentially cause one or more server computers within the computing facility to malfunction (e.g., crash, hang, or reboot) or be denied network services. As another specific example, a faulty or malicious design from one user could potentially corrupt or read data from another user if the configured logic is able to read and/or write memory of the other user's memory space.

As described herein, a compute service's facility can include a variety of computing resources, where one type of the computing resources can include a server computer comprising a configurable logic platform as part of a host logic. The configurable logic platform can be programmed or configured by a user of the computer system so that hardware (e.g., the configurable logic) of the computing resource is customized by the user. For example, the user can program the configurable logic so that it functions as a hardware accelerator that is tightly coupled to the server computer. As a specific example, the hardware accelerator can be accessible via a local interconnect, such as Peripheral Component Interconnect Express (PCI-Express or PCIe), of the server computer. The user can execute an application on the server computer and tasks of the application can be performed by the hardware accelerator using PCIe transactions. By tightly coupling the hardware accelerator to the server computer, the latency between the accelerator and the server computer can be reduced, which can increase the processing speed of the application. The configurable logic platform can be a wide variety of reconfigurable logic ICs, but a typical example is an FPGA, which will be used in specific examples below, but should be understood that other reconfigurable hardware can be used instead.

The compute service provider can potentially increase the security and/or availability of the computing resources by wrapping or encapsulating the user's programmed hardware (also referred to herein as customer logic) within host logic of the configurable logic platform. Encapsulating the customer logic can include limiting or restricting the customer logic's access to configuration resources, physical interfaces, hard macros of the configurable logic platform, and various peripherals of the configurable logic platform. For example, the compute service provider can manage the programming of the configurable logic platform so that it includes both the host logic and the customer logic. The host logic can provide a framework or sandbox for the customer logic to work within. In particular, the host logic can communicate with the customer logic and constrain the functionality of the customer logic. For example, the host logic can perform bridging functions between the local interconnect (e.g., the PCIe interconnect) and the customer logic so that the customer logic cannot directly control the signaling on the local interconnect. The host logic virtualizes the customer logic so that the customer logic operates as if it is communicating directly to a virtual machine. The host logic can be responsible for forming packets or bus transactions on the local interconnect and ensuring that the protocol requirements are met. By controlling transactions on the local interconnect, the host logic can potentially prevent malformed transactions or transactions to out-of-bounds locations. As another example, the host logic can isolate a configuration access port so that the customer logic cannot cause the configurable logic platform to be reprogrammed without using services provided by the compute services provider.

In some embodiments, the host logic can include a static portion and a reconfigurable portion. The static portion can be static host logic that is included in many configurable logic platforms as it includes core functionality that typically does not change. One example of such static host logic includes any PCIe bus control functionality. Another example can include mailbox functionality through which a virtual machine can communicate with a management hypervisor. The reconfigurable portion of the host logic can include other features described further below, such as the configurable logic platform management hardware. The reconfigurable portion can also include protection logic used to ensure that customer logic within the configurable logic platform cannot be used maliciously to impact the host server computer.

A customer can choose to load new logic within the configurable logic platform, including the reconfigurable portion. For example, a virtual machine can use an identifier in association with an API request, wherein the identifier can point to a customer logic and an associate reconfigurable portion, which is tightly coupled to the customer logic. When such a request is received, first customer logic executing on the configurable logic platform is to be replaced with second customer logic. However, during this transition between the first and second customer logics, security issues can arise. For example, the first customer logic can perform unauthorized operations if the reconfigurable portion of the host logic is inactive due to being replaced. Specifically, protection logic within the reconfigurable host logic can be temporarily inactive. Thus, in order to protect the host server computer during a transition that replaces first customer logic with second customer logic, the following can be executed in response to a request from an instance to load new customer logic: Customer account permissions can be checked; A check can be made whether the reconfigurable host logic is already loaded and, if so, then load the customer logic; If not, the a check can be made to ensure that the standard load of customer logic can be performed; A response can be generated to inform the instance that the load request was accepted; The sequence for loading the reconfigurable host logic can include deactivating at least a portion of the configurable logic platform within the instance, which can be accomplished through pausing the instance or manipulate a driver on the instance to effectively detach the configurable logic platform from the instance. Existing customer logic within the configurable logic platform can then be cleared or deactivated. The reconfigurable host logic can then be loaded. The customer logic can then be loaded and activated. And, finally, the configurable logic platform is activated, either through unpausing or attaching the configurable logic platform to the instance.

FIG. 1 provides an embodiment of a system 100 for virtualizing customer programmable ICs (e.g., virtualizing designs for configurable logic). The system 100 includes a host server computer 110 coupled to a logic repository service 112 via a network (not shown). The logic repository service 112 is discussed further below in relation to FIG. 3, however, it is a service from which customer logic can be retrieved and loaded into the host server computer 110. The host server computer 110 includes a software portion 120 and a hardware portion 122. The software portion 120 includes a plurality of virtual machines 130 and a management hypervisor 134. The management hypervisor 134 partitions resources of the server computer to the virtual machines 130 so that each virtual machine can share processing capacity, memory, etc. of the host server computer 110. The hardware portion 122 includes a configurable logic platform 132, which is a programmable Integrated Circuit (IC), such as a Field Programmable Gate Array (FPGA).

The configurable logic platform 132 includes a host logic wrapper 140 (also called more generally "host logic" or a "shell") comprising a static host logic portion 142 and a reconfigurable host logic portion 144. The host logic wrapper 140 can include management hardware that performs security functionality, monitoring functionality, etc. The management hardware also provides encapsulation or sandboxing of programmable customer logic 150 so that one customer cannot obtain secure information associated with the operation of another customer's programmable IC. Likewise, the management logic can include functionality to ensure that the programmable ICs are not utilizing more resources than other programmable ICs. The static host logic portion 142 includes logic elements that are configured at boot time by loading from a storage device, such as a flash device. The static logic is intended to not be modified except with an externally controlled reset signal or power-cycle. The reconfigurable logic portion 144 is a general label for logic elements that can be reconfigured at runtime. Thus, the reconfigurable logic portion 144 can be dynamically changed in response to one of the virtual machines 130 requesting an update to logic within the configurable logic platform. Together, the host logic wrapper 140 includes logic deployed by the service provider (the host) on the configurable logic platform to enforce some level of device manageability and security. The host logic wrapper protects the system from attacks, such as PCIe level attacks. Such protection is a result of the host logic wrapper having control of an interface, for example. In one specific example, the host logic wrapper has control of the PCIe interface(s) including the PCIe addresses and PCIe Bus/Dev/Func (or ARI). In terms of the reconfigurable host logic 144, such device management and security is shown generically as protection logic 146.

The configurable logic platform 132 also includes programmable customer logic 150. The customer logic 150 is a portion of the configurable logic platform 132 in which a customer associated with a virtual machine 130 can control. Customers can upload logic to the logic repository service 112 for use by the host server computer 110. Through the management hypervisor 134, such logic can be downloaded to the programmable customer logic 150. The virtual machine 130 can then communicate with the customer logic within the configurable logic platform via the host logic wrapper 140.

The configurable logic platform 132 can include reconfigurable logic blocks (reconfigurable hardware) and other hardware. The reconfigurable logic blocks can be configured or programmed to perform various functions as desired by a customer of a compute service provider. The reconfigurable logic blocks can be programmed multiple times with different configurations so that the blocks can perform different hardware functions over the lifetime of the device. The functions of the configurable logic platform 132 can be categorized based upon the purpose or capabilities of each function, or based upon when the function is loaded. For example, the configurable logic platform can include static logic, reconfigurable logic, and hard macros. The functionality for the static logic, reconfigurable logic, and hard macros can be configured at different times. A hard macro can perform a predefined function and can be available when the IC is powered on. For example, a hard macro can include hardwired circuits that perform a specific function. As specific examples, the hard macros can include a configuration access port (CAP) for configuring the programmable IC, a serializer-deserializer transceiver (SERDES) for communicating serial data, a memory or dynamic random access memory (DRAM) controller for signaling and controlling off-chip memory (such as a double data rate (DDR) DRAM), and a storage controller for signaling and controlling a storage device. Other types of communication ports can be used as the shared peripheral interface. Other types include, but are not limited to, Ethernet, a ring topology, or other types of networking interfaces.

The static logic can be loaded at boot time onto reconfigurable logic blocks. For example, configuration data specifying the functionality of the static logic can be loaded from an on-chip or off-chip flash memory device during a boot-up sequence. The boot-up sequence can include detecting a power event (such as by detecting that a supply voltage has transitioned from below a threshold value to above the threshold value) and de-asserting a reset signal in response to the power event. An initialization sequence can be triggered in response to the power event or the reset being de-asserted. The initialization sequence can include reading configuration data stored on a flash device and loading the configuration data onto the programmable IC so that at least a portion of the reconfigurable logic blocks are programmed with the functionality of the static logic. After the static logic is loaded, the programmable IC can transition from a loading state to an operational state that includes the functionality of the static logic.

The reconfigurable host logic can be loaded onto reconfigurable logic blocks while the programmable IC is operational (e.g., after the static logic has been loaded). The configuration data corresponding to the reconfigurable host logic can be stored in an on-chip or off-chip memory and/or the configuration data can be received or streamed from an interface. The reconfigurable host logic can be divided into non-overlapping regions, which can interface with static logic. For example, the reconfigurable regions can be arranged in an array or other regular or semi-regular structure. For example, the array structure may include holes or blockages where hard macros are placed within the array structure. The different reconfigurable regions can communicate with each other, the static logic, and the hard macros by using signal lines that can be specified as static logic. The different reconfigurable regions can be configured at different points in time so that a first reconfigurable region can be configured at a first point in time and a second reconfigurable region can be configured at a second point in time.

The functions of the configurable logic platform 132 can be divided or categorized based upon the purpose or capabilities of the functions. For example, the functions can be categorized as control plane functions, data plane functions, and shared functions. A control plane can be used for management and configuration. The data plane can be used to manage data transfer between customer logic 150 and the server computer 110. Shared functions can be used by both the control plane and the data plane. The control plane functionality can be loaded onto the configurable logic platform prior to loading the data plane functionality. The data plane can include encapsulated reconfigurable host logic configured with customer application logic. The control plane can include host logic associate with a content service provider.

Generally, the data plane and the control plane can be accessed using different functions, where the different functions are assigned to different address ranges. The control plane functions can be used to monitor and restrict the capabilities of the data plane. Typically, all control plane functions reside within the host logic wrapper 140. The data plane functions can be used to accelerate a user's application that is running on the server computer. By separating the functions of the control and data planes, the security and availability of the server computer 110 and other computing infrastructure can potentially be increased. For example, the application logic cannot directly signal onto the physical interconnect because the intermediary layers of the control plane control the formatting and signaling of transactions of the physical interconnect. As another example, the application logic can be prevented from using the private peripherals which could be used to reconfigure the programmable IC and/or to access management information that may be privileged. As another example, the application logic can access hard macros of the programmable IC through intermediary layers so that any interaction between the application logic and the hard macros is controlled using the intermediary layers.

When customer logic is programmed within region 150, the virtual machine 130 can decide to change the customer logic and load different customer logic retrieved from the logic repository service 112. A potential security problem arises, however, during the transition from one customer logic to another customer logic. In a particular example, the reconfigurable host logic 144 can also be changed, which can result in some control plane functionality being offline during the transition period. With control plane functionality inactive, the virtual machine 130 and/or the customer logic 150 can have access to privileges outside of its authorization. To close such a potential security loophole, the management hypervisor 134 can prevent the customer logic from communicating. Such prevention can be implemented by clearing or deactivating the customer logic during the loading of the host logic wrapper 140. Such clearing or deactivating is illustrated at 160. In addition, during the transition period, the management hypervisor 134 can pause or deactivate the virtual machine 130, as indicated at 170. However, the static host logic 142 remains active, as indicated at 180. Thus, communication can continue between the virtual machine 130 and the management hypervisor 134 through the static host logic 142.

In some embodiments, the customer logic need not be reprogrammed and can remain unchanged. In such situations, the customer logic and/or the virtual machine can still be prevented from communicating as described herein for security reasons. During this time, the reconfigurable host logic can be reprogrammed.

Figure 2:
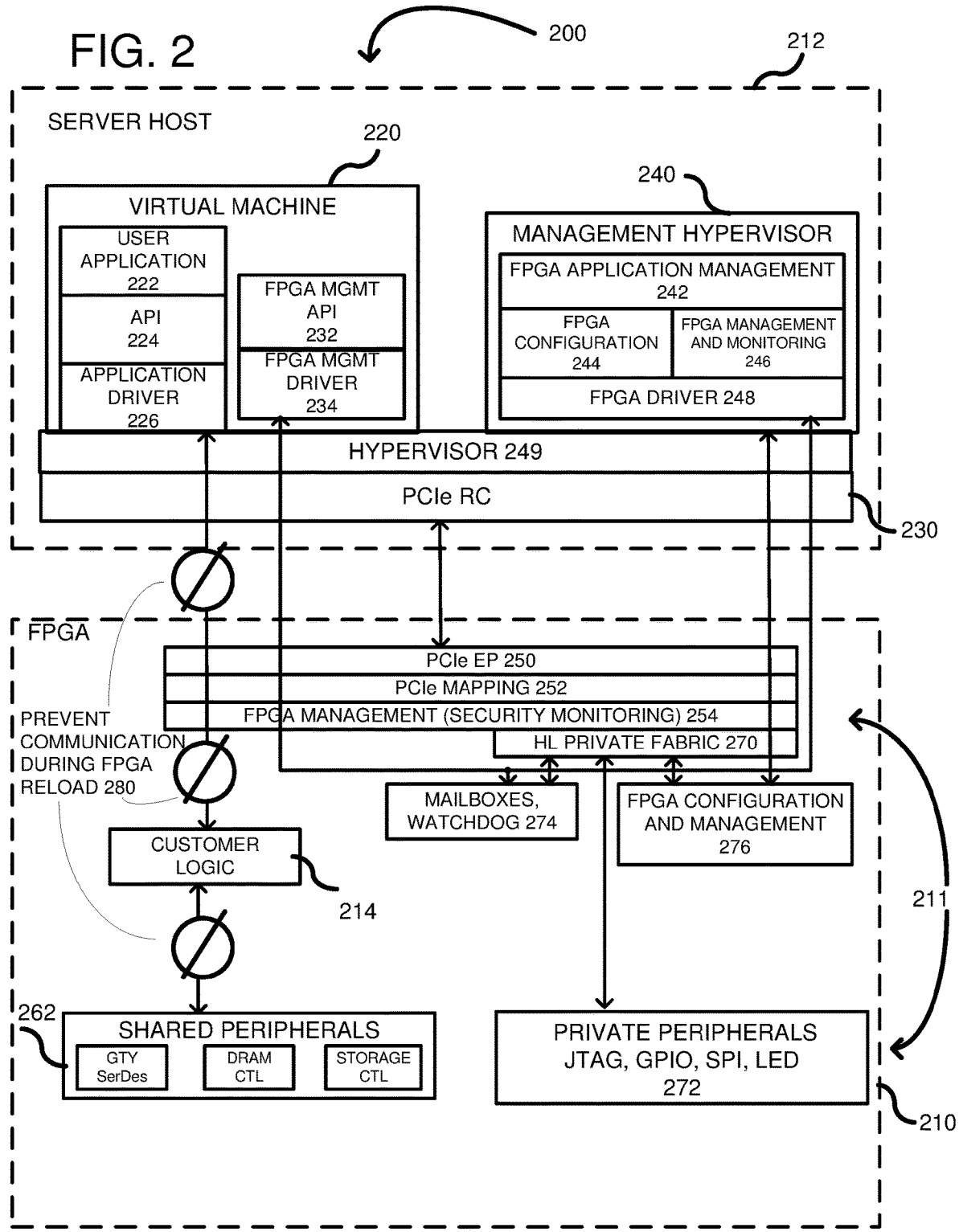
FIG. 2 is an example embodiment showing further details of an environment including the host logic of FIG. 1.

FIG. 2 is a detailed example of one embodiment of a system 200 wherein an FPGA 210 is includes both host logic, shown generally at 211, and customer logic 214. Although the IC is shown as FPGA, other types of programmable ICs can be used. The FPGA can be positioned on one or more plug-in cards on the host server computer 212 or otherwise positioned on a motherboard of the host server computer.

The server host 212 can execute one or more virtual machines, such as virtual machine 220. In this particular example, the virtual machine 220 includes applications for supporting hardware programmed into the customer logic 214, within the FPGA 210. The virtual machine 220 can include a user application 222, an API 224, and an application driver 226. The user application 222 can send commands and receive requests to and from the customer logic 214 via the API 224. The API 224 communicates the commands and requests through an application driver 226. The application driver 226 communicates through a PCIe root complex 230 positioned on the server host 212. The root complex connects a processor and memory subsystem on the server host 212 to a PCI switch fabric, which includes switching devices. In this way, the root complex is considered routing logic. The virtual machine 220 further includes an FPGA management API 232 and an FPGA management driver 234, which can be used in the configuration and management of the customer FPGA 214. Although other virtual machines are not shown, each virtual machine has its own FPGA management API and management driver for controlling its respective FPGA. A management hypervisor 240 can execute an FPGA management application 242, FPGA configuration 244 and FPGA management and monitoring 246. These applications can communicate and control the FPGAs through an FPGA driver 248. The management hypervisor 240 (e.g., Dom 0) can oversee and manage multiple virtual machines, including virtual machine 220. The virtual machine 220 and management hypervisor 240 execute on a hypervisor 249, which allows communication with underlying server hardware (not shown), such as a CPU and storage. Running a layer above the hardware is the hypervisor or kernel layer 249. The hypervisor or kernel layer can be classified as a type 1 or type 2 hypervisor. A type 1 hypervisor runs directly on the host hardware to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. The management hypervisor 240 can be part of the hypervisor or separated therefrom and generally includes device drivers needed for accessing the hardware. The virtual machines 220 run in partitions that are logical units of isolation by the hypervisor. Each partition can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

The FPGA 210 includes multiple host modules for configuring, managing, and communicating with the customer logic 214. The FPGA 210 includes a PCIe endpoint 250 that acts as an endpoint to which the root complex 230 can switch communications. A PCIe mapping layer 252 can differentiate transactions from the server computer 212 bound for the different customer logics. Transactions pass through an FPGA management layer 254, which provides security and monitoring of the transactions to ensure that encapsulation is maintained between customers. For example, the FPGA management layer can potentially identify transactions or data that violate predefined rules and can generate an alert in response. Additionally or alternatively, the FPGA management 254 can terminate any transactions generated that violate any predetermined criteria. Shared peripherals 262 are shared functions that are accessible from either the control plane or the data plane. The shared peripherals are components that can have multiple address mappings and can be used by both the control plane and the data plane. Examples of the shared peripherals include the SerDes interface, DRAM control (e.g., DDR DRAM), storage device control (e.g., hard disk drives and solid-state drives), and other various components that can be used to generate, store, or process information. The shared peripherals 262 can include additional peripheral control. Communications can pass through a host logic private fabric 270 for accessing private peripherals 272. Private peripherals 272 are components that are only accessible by the compute service provider and are not accessible by customers. The private peripherals can include JTAG (e.g., IEEE 1149.1), General purpose I/O (GPIO), serial peripheral interface (SPI) flash memory, and light emitting displays (LEDs). The illustrated peripherals are just examples and other peripherals can be used.

The mailboxes and watchdog timers 274 are shared functions that are accessible from either the control plane or the data plane. Specifically, the mailboxes can be used to pass messages and other information between the control plane and the data plane. For example, the mailboxes can include buffers, control registers (such as semaphores), and status registers. By using the mailboxes as an intermediary between the control plane and the data plane, isolation between the data plane and the control plane can potentially be increased, which can increase the security of the configurable hardware platform. The mailboxes also allow communication between the virtual machine 220 and the management hypervisor 240. The watchdog timers can be used to detect and recover from hardware and/or software malfunctions. For example, a watchdog timer can monitor an amount of time taken to perform a particular task, and if the amount of time exceeds a threshold, the watchdog timer can initiate an event, such as writing a value to a control register or causing an interrupt or reset to be asserted.

The FPGA configuration and management block 276 can include functions related to managing and configuring the FPGA. For example, the configuration and management block 276 can provide access for configuring the FPGA.

Specifically, the server computer 212 can send a transaction to block 276 to initiate loading of the customer logic. The division of these modules between static logic and reconfigurable host logic depends on the design. In one embodiment, the static logic can include the PCIe logic 250, 252, and the mailboxes 274. The reconfigurable host logic can include the remaining components, such as the FPGA management 254, the private peripherals 272, etc.

As shown at 280, during re-programming of the customer logic 214, the customer logic and the virtual machine 220 are prevented (blocked) from communicating with each other or with the PCIe end point 250 through the application driver 226. However, communications from the FPGA management driver 234 can continue through the PCIe endpoint 250. This allows the virtual machine 220 to communicate with the management hypervisor 240 through the mailboxes 274. Thus, the virtual machine 220 can communicate using the PCIe bus, but PCIe communications to the customer logic 214 are blocked. There are multiple ways to prevent the virtual machine 220 from communicating with the customer logic 214 within the FPGA 210. A first way is to pause the virtual machine during a period which the reconfigurable host logic is being loaded. Such a pausing of the virtual machine can last on the order of hundreds of milliseconds, so the disruption is relatively minor. The management hypervisor 240 can control the pausing of the virtual machine 220, using known instructions. A second way to prevent communication between the virtual machine 220 and the customer logic 214 is to disable or detach the application driver 226. Again, such disabling or deactivation can be controlled by the management hypervisor 240. The disabling or deactivation can be considered a hot unplug of the customer logic 214 from the virtual machine. The hot unplug results in removing the customer logic 214 from a memory map of the virtual machine so as to detach the customer logic from the virtual machine. As shown, disabling of the application driver 226 prevents communication with the customer logic 214, but does not prevent the FPGA management driver 234 from communicating with the mailboxes 274. Thus, a portion of the communication channels between the virtual machine 220 and the FPGA 210 are deactivated and a portion remain active.

The customer logic 214 can also be prevented from communicating with the virtual machine 220. Such a prevention can occur by clearing or deactivating the customer logic 214. Deactivating the customer logic 214 can include that the customer logic 214 is blocked from communicating through the static logic, such as the PCIe bus. The customer logic can further be blocked from using shared peripherals 262. By blocking the customer logic 214 from communicating during loading of the reconfigurable host logic, the overall server host 212 is protected during the loading of the host logic wrapper within the FPGA.

Figure 3:
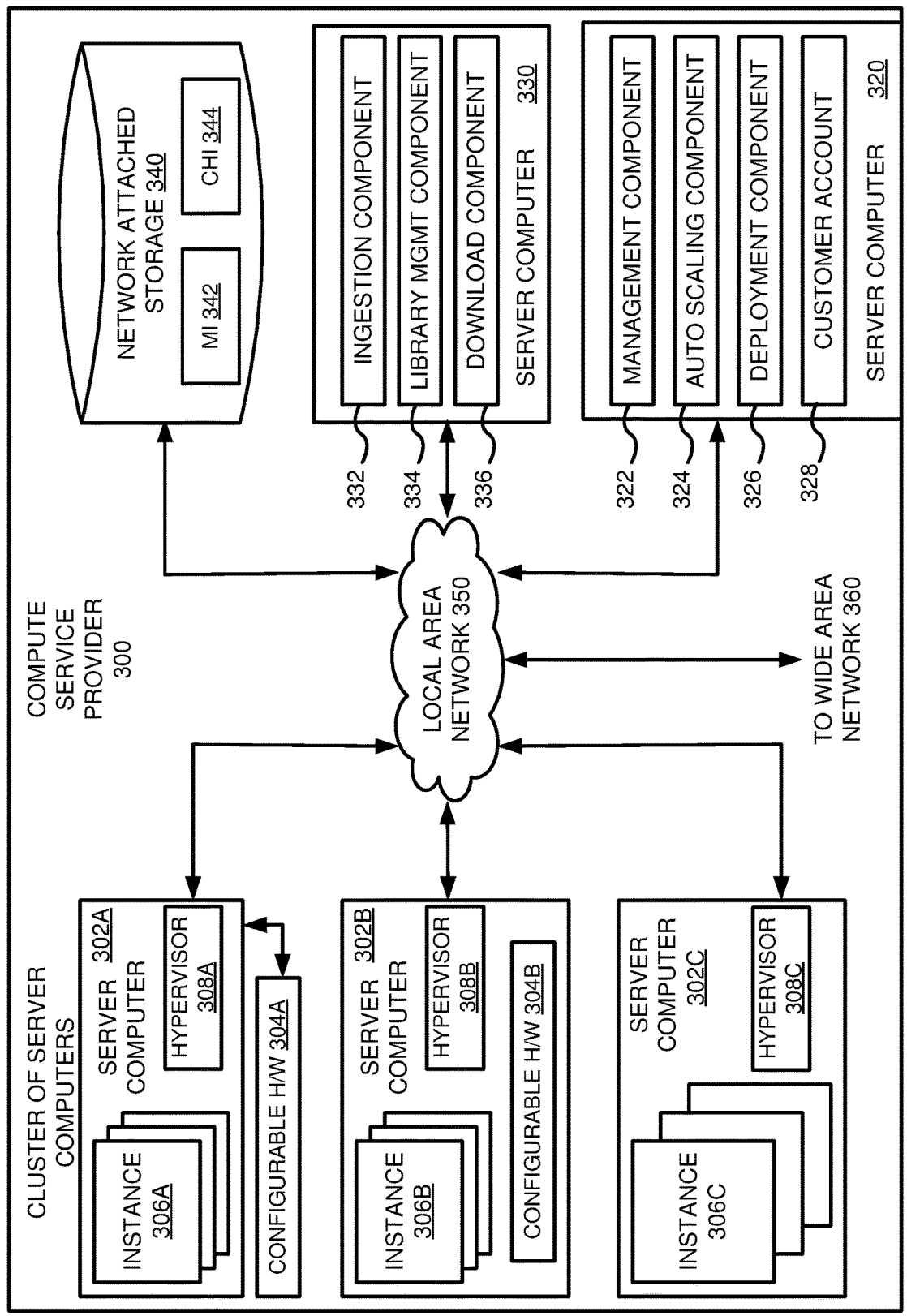
FIG. 3 is an example system diagram showing a plurality of virtual machine instances running on server computers including the programmable hardware of FIG. 1 or 2.

FIG. 3 is a computing system diagram of a network-based compute service provider 300 that illustrates one environment in which embodiments described herein can be used. By way of background, the compute service provider 300 (i.e., the cloud provider) is capable of delivery of computing and storage capacity as a service to a community of end recipients. In an example embodiment, the compute service provider can be established for an organization by or on behalf of the organization. That is, the compute service provider 300 may offer a "private cloud environment." In another embodiment, the compute service provider 300 supports a multi-tenant environment, wherein a plurality of customers operate independently (i.e., a public cloud environment). Generally speaking, the compute service provider 300 can provide the following models: Infrastructure as a Service ("IaaS"), Platform as a Service ("PaaS"), and/or Software as a Service ("SaaS"). Other models can be provided. For the IaaS model, the compute service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. Additionally, application developers can develop and run their hardware solutions on configurable hardware of the compute service provider platform. The SaaS model allows installation and operation of application software in the compute service provider. In some embodiments, end users access the compute service provider 300 using networked client devices, such as desktop computers, laptops, tablets, smartphones, etc. running web browsers or other lightweight client applications. Those skilled in the art will recognize that the compute service provider 300 can be described as a "cloud" environment.

The particular illustrated compute service provider 300 includes a plurality of server computers 302A-302C. While only three server computers are shown, any number can be used, and large centers can include thousands of server computers. The server computers 302A-302C can provide computing resources for executing software instances 306A-306C. In one embodiment, the software instances 306A-306C are virtual machines. As known in the art, a virtual machine is an instance of a software implementation of a machine (i.e. a computer) that executes applications like a physical machine. In the example of a virtual machine, each of the servers 302A-302C can be configured to execute a hypervisor 308 or another type of program configured to enable the execution of multiple software instances 306 on a single server. Additionally, each of the software instances 306 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

The server computers 302A-302C can include a heterogeneous collection of different hardware resources or instance types. Some of the hardware instance types can include configurable hardware that is at least partially configurable by a user of the compute service provider 300. One example of an instance type can include the server computer 302A which is in communication with configurable hardware 304A. Specifically, the server computer 302A and the configurable hardware 304A can communicate over a local interconnect such as PCIe. In this example, the server computer 302A and the configurable hardware 304A are within the same server chassis, but the server computer 302A is a motherboard and the configurable hardware 304A is a plugin board to the motherboard. Another example of an instance type can include the server computer 302B and configurable hardware 304B. For example, the configurable logic 304B can be integrated within a multi-chip module or on the same die as a CPU of the server computer 302B. Yet another example of an instance type can include the server computer 302C without any configurable hardware. Thus, hardware instance types with and without configurable logic can be present within the resources of the compute service provider 300.

One or more server computers 320 can be reserved for executing software components for managing the operation of the server computers 302 and the software instances 306. For example, the server computer 320 can execute a management component 322. A customer can access the management component 322 to configure various aspects of the operation of the software instances 306 purchased by the customer. For example, the customer can purchase, rent or lease instances and make changes to the configuration of the software instances. The configuration information for each of the software instances can be stored as a machine image (MI) 342 on the network-attached storage 340. Specifically, the MI 342 describes the information used to launch a VM instance. The MI can include a template for a root volume of the instance (e.g., an OS and applications), launch permissions for controlling which customer accounts can use the MI, and a block device mapping which specifies volumes to attach to the instance when the instance is launched. The MI can also include a reference to a configurable hardware image (CHI) 344 which is to be loaded on configurable hardware 304 when the instance is launched. The CHI includes configuration data for programming or configuring at least a portion of the configurable hardware 304.

The customer can also specify settings regarding how the purchased instances are to be scaled in response to demand. The management component can further include a policy document to implement customer policies. An auto scaling component 324 can scale the instances 306 based upon rules defined by the customer. In one embodiment, the auto scaling component 324 allows a customer to specify scale-up rules for use in determining when new instances should be instantiated and scale-down rules for use in determining when existing instances should be terminated. The auto scaling component 324 can consist of a number of subcomponents executing on different server computers 302 or other computing devices. The auto scaling component 324 can monitor available computing resources over an internal management network and modify resources available based on need.

A deployment component 326 can be used to assist customers in the deployment of new instances 306 of computing resources. The deployment component can have access to account information associated with the instances, such as who is the owner of the account, credit card information, country of the owner, etc. The deployment component 326 can receive a configuration from a customer that includes data describing how new instances 306 should be configured. For example, the configuration can specify one or more applications to be installed in new instances 306, provide scripts and/or other types of code to be executed for configuring new instances 306, provide cache logic specifying how an application cache should be prepared, and other types of information. The deployment component 326 can utilize the customer-provided configuration and cache logic to configure, prime, and launch new instances 306. The configuration, cache logic, and other information may be specified by a customer using the management component 322 or by providing this information directly to the deployment component 326. The instance manager can be considered part of the deployment component.

Customer account information 328 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, a listing of the MI's and CHI's accessible to the customer, etc.

One or more server computers 330 can be reserved for executing software components for managing the download of configuration data to configurable hardware 304 of the server computers 302. For example, the server computer 330 can execute a logic repository service comprising an ingestion component 332, a library management component 334, and a download component 336. The ingestion component 332 can receive host logic and application logic designs or specifications and generate configuration data that can be used to configure the configurable hardware 304. The library management component 334 can be used to manage source code, user information, and configuration data associated with the logic repository service. For example, the library management component 334 can be used to store configuration data generated from a user's design in a location specified by the user on the network-attached storage 340. In particular, the configuration data can be stored within a configurable hardware image 342 on the network-attached storage 340. Additionally, the library management component 334 can manage the versioning and storage of input files (such as the specifications for the application logic and the host logic) and metadata about the logic designs and/or the users of the logic repository service. The library management component 334 can index the generated configuration data by one or more properties such as a user identifier, an instance type, a marketplace identifier, a machine image identifier, and a configurable hardware identifier, for example. The download component 336 can be used to authenticate requests for configuration data and to transmit the configuration data to the requestor when the request is authenticated. For example, agents on the server computers 302A-B can send requests to the download component 336 when the instances 306 are launched that use the configurable hardware 304. As another example, the agents on the server computers 302A-B can send requests to the download component 336 when the instances 306 request that the configurable hardware 304 be partially reconfigured while the configurable hardware 304 is in operation.

The network-attached storage (NAS) 340 can be used to provide storage space and access to files stored on the NAS 340. For example, the NAS 340 can include one or more server computers used for processing requests using a network file sharing protocol, such as Network File System (NFS). The NAS 340 can include removable or non-removable media, including magnetic disks, storage area networks (SANs), redundant arrays of independent disks (RAID), magnetic tapes or cassettes, CD-ROMs, DVDs, or any other medium which can be used to store information in a non-transitory way and which can be accessed over the network 350.

The network 350 can be utilized to interconnect the server computers 302A-302C, the server computers 320 and 330, and the storage 340. The network 350 can be a local area network (LAN) and can be connected to a Wide Area Network (WAN) 360 so that end users can access the compute service provider 300. It should be appreciated that the network topology illustrated in FIG. 3 has been simplified and that many more networks and networking devices can be utilized to interconnect the various computing systems disclosed herein.

The instances 306 can request a new CHI 344 to be loaded into the configurable hardware 304. When such a request is received, the hypervisor 308 can retrieve the CHI 344 and any associated reconfigurable host logic. For example, the CHI 344 can include metadata that points to the reconfigurable host logic associated therewith. The CHI 344 and the reconfigurable host logic are then loaded into the configurable hardware 304 using the protection described herein.

Figure 4:
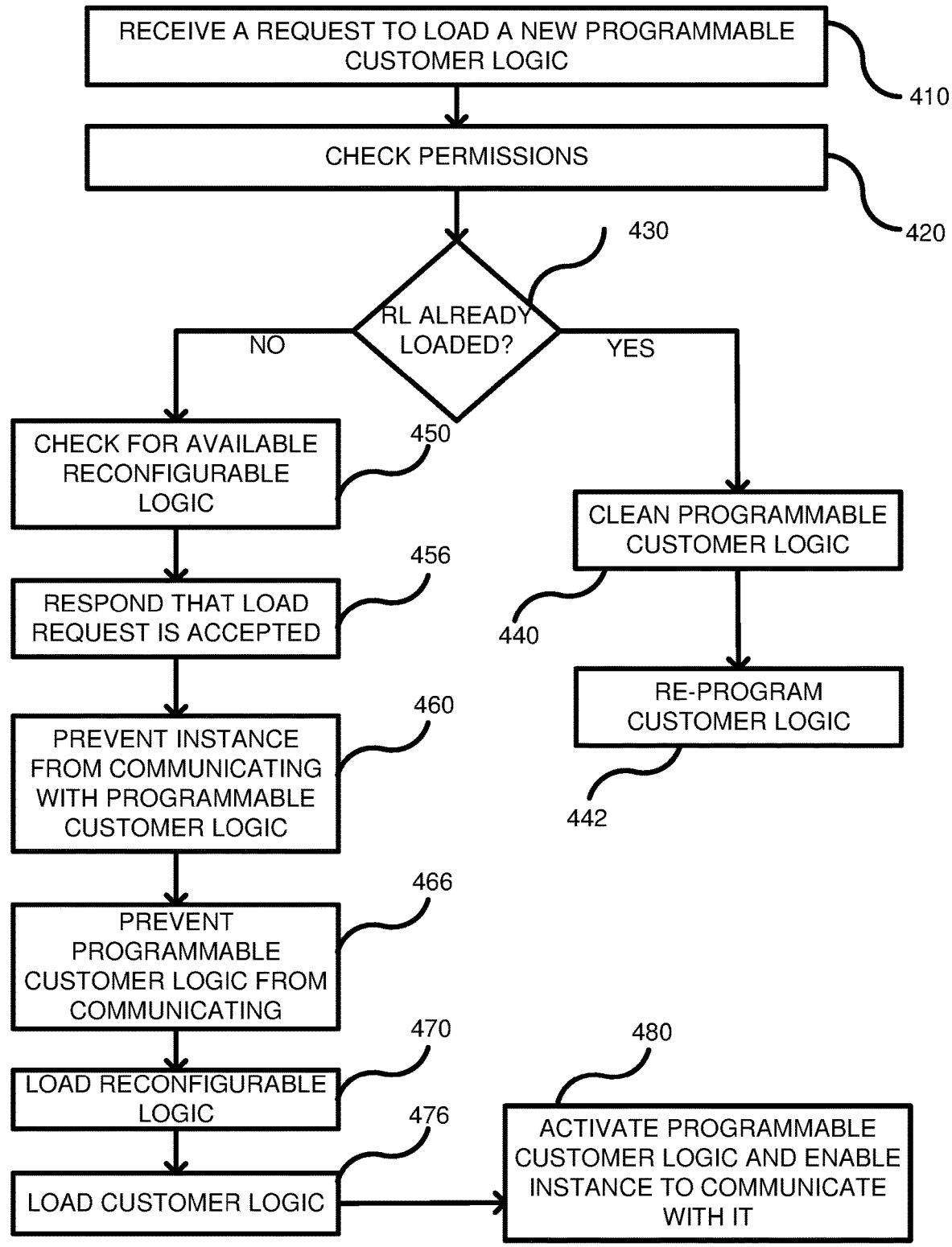
FIG. 4 is a flowchart of a method according to one embodiment for reconfiguring the programmable hardware of FIG. 1 or 2.

FIG. 4 is a flowchart according to one embodiment for reconfiguring programmable hardware in a multi-tenant environment. In process block 410, a request is received to load new programmable customer logic. For example, turning briefly to FIG. 2, the virtual machine 220 can make a request to the management hypervisor 240 to load new customer logic in order to replace existing customer logic 214 within the FPGA 210. Other techniques for making a request can include receiving an API indicating that new programmable customer logic should be downloaded into the configurable logic platform. The new customer logic can be linked to reconfigurable host logic, which can also be downloaded to replace any existing reconfigurable host logic. In process block 420, permissions are checked to ensure that the requestor has authorization to download new configurable logic into the configurable logic platform. If not, the request is rejected. If permissions are authorized, then in decision block 430, a check is made to determine whether the reconfigurable host logic is already loaded into the FPGA. Thus, a determination is made regarding which reconfigurable host logic is associated with the new configurable logic and which reconfigurable host logic is currently loaded in the configurable logic platform. If they match, then decision block 430 is answered in the affirmative and the process continues to process block 440. Because the reconfigurable host logic is not being changed, any protection logic associated therewith is continuously present and can continue to function. As a result, new customer logic can be downloaded by first cleaning (process block 440) the existing customer logic from the configurable logic platform and then re-programming the customer logic in process block 442.

If decision block 430 is answered in the negative, then in process block 450, a check is made for the available reconfigurable host logic. Specifically, a check can be made whether the reconfigurable host logic is available for download. For example, returning briefly to FIG. 3, the customer logic can be analyzed within the network storage 344. The CHI 344 has reconfigurable host logic associated with each customer logic. Depending on an identifier of the customer logic that is to be loaded, the reconfigurable logic identifier can also be obtained. This reconfigurable logic identifier can be checked to ensure the customer has authorization to download the new host logic. In process block 456, after all of the authorization checks are made, a response can be transmitted to the requestor that the request has been accepted. In process block 460, protections are made during the loading process to ensure that the virtual machine and/or the customer logic cannot perform unauthorized operations while the reconfigurable host logic is vulnerably being replaced. In particular, the virtual machine instance that is coupled to the customer logic is prevented from communicating with the customer logic. Such prevention can include pausing the virtual machine instance, disabling a device driver coupling the virtual machine instance to the customer logic, or disabling other hardware along the communications path between the virtual machine instance and the customer logic. In process block 466, the current customer logic within the configurable logic platform is prevented from communicating. For example, the customer logic can be prevented from communicating with the virtual machine instance, with shared peripherals, and with the PCIe bus. One potential method form preventing the customer logic from communicating is by clearing the customer logic, such as by clearing all of the programmed gates. Cleared gates can result in floating hardware lines, so further acts can be taken to pull-up or pull-down the hardware lines that could have a floating voltage level. Thus, while some gates are cleared, others can be programmed to operate as pull-ups or pull-downs. With communications prevented from both the virtual machine and the customer logic, in process block 470, the reconfigurable host logic can be loaded and made operational. In process block 476, customer logic can then be loaded. Thus, the CHI 344 can be loaded (programmed) into the FPGA at 214 (see FIG. 2). At process block 480, the customer logic can be activated and the instance enabled to allow communication there between. For example, the application driver 226 can be activated for communicating with the customer logic 214. The customer logic can also be enabled to perform communication with the peripherals 262, the PCIe bus, or the virtual machine 220. In some embodiments, new customer logic need not be loaded and the customer logic can remain unchanged. In one example, a service provider can decide to change the reconfigurable host logic without receiving a request from the customer to perform such a change. The service provider can then perform an upgrade to the reconfigurable host logic by performing process blocks 460, 466, 470 and 480.

Figure 5:
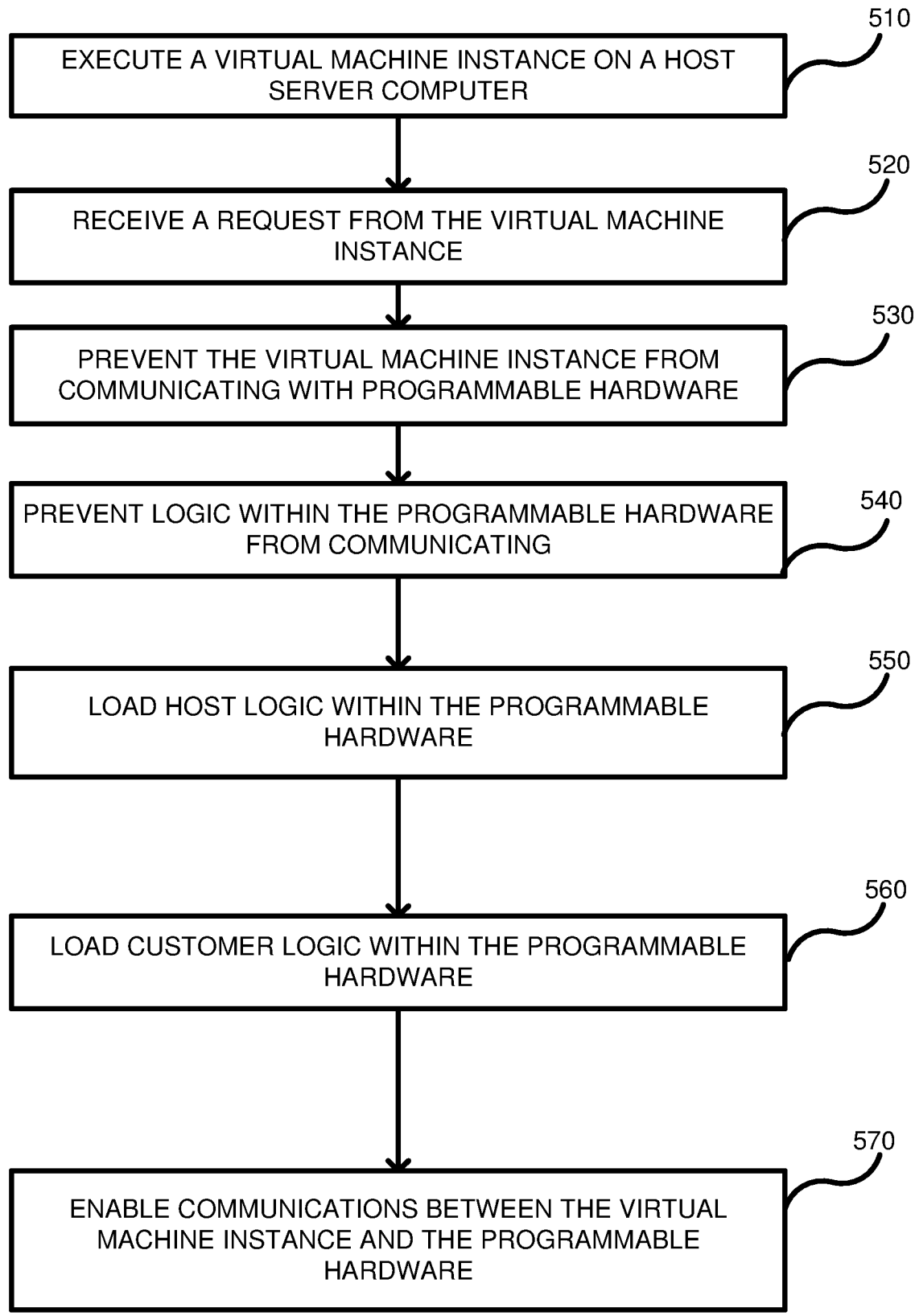
FIG. 5 is a flowchart according to another embodiment for reconfiguring the programmable hardware.

FIG. 5 is a flowchart according to another embodiment for reconfiguring programmable hardware. In process block 510, a virtual machine instance is executed on a host server computer. An example virtual machine is shown at 130 in FIG. 1. The virtual machine can be executed on top of a hypervisor, such as hypervisor 249 (FIG. 2). In process block 520, a request is received from the virtual machine instance. The request can include an identifier to a CHI (see FIG. 3 at 344). The CHI identified can include metadata, such as a pointer to reconfigurable host logic (see FIG. 1 at 144). Both the identified CHI and the reconfigurable host logic can be loaded into the configurable logic platform 132 in response to the request. However, protections can be put in place for security reasons. Thus, in process block 530, the virtual machine instance that made the request can be prevented from communicating with the programmable hardware. For example, the virtual machine instance can be prevented from communicating with the configurable logic platform altogether or prevented from communicating with the customer logic portion of the configurable logic platform. Blocking of such communications can be a result of pausing the virtual machine instance, removing device drivers or making the device drivers temporarily inoperable. In process block 540, logic within the programmable hardware can be prevented from communicating with other components in the server computer. For example, the customer logic can be prevented from communicating in ways that could be damaging to the host server computer. In one example, the customer logic can be blocked from communicating with shared peripherals and with the PCIe bus. Such prevention can be accomplished by clearing the portion of the configurable logic platform containing the customer logic. In process block 550, the host logic can be loaded within the programmable hardware. For example, an FPGA can have a host logic wrapper including a static portion and a reconfigurable portion. The static portion can remain unchanged, while the reconfigurable portion can be loaded into the programmable hardware so as to update the reconfigurable portion. In process block 560, the customer logic can be loaded in the programmable hardware. Thus, gates within the configurable logic platform can be programmed with the customer logic identified in the request. In process block 570, communications can be enabled between the virtual machine instance and the programmable hardware. For example, the virtual machine instance can be un-paused or its device driver can be activated to enable communications with the programmable hardware.

Figure 6:
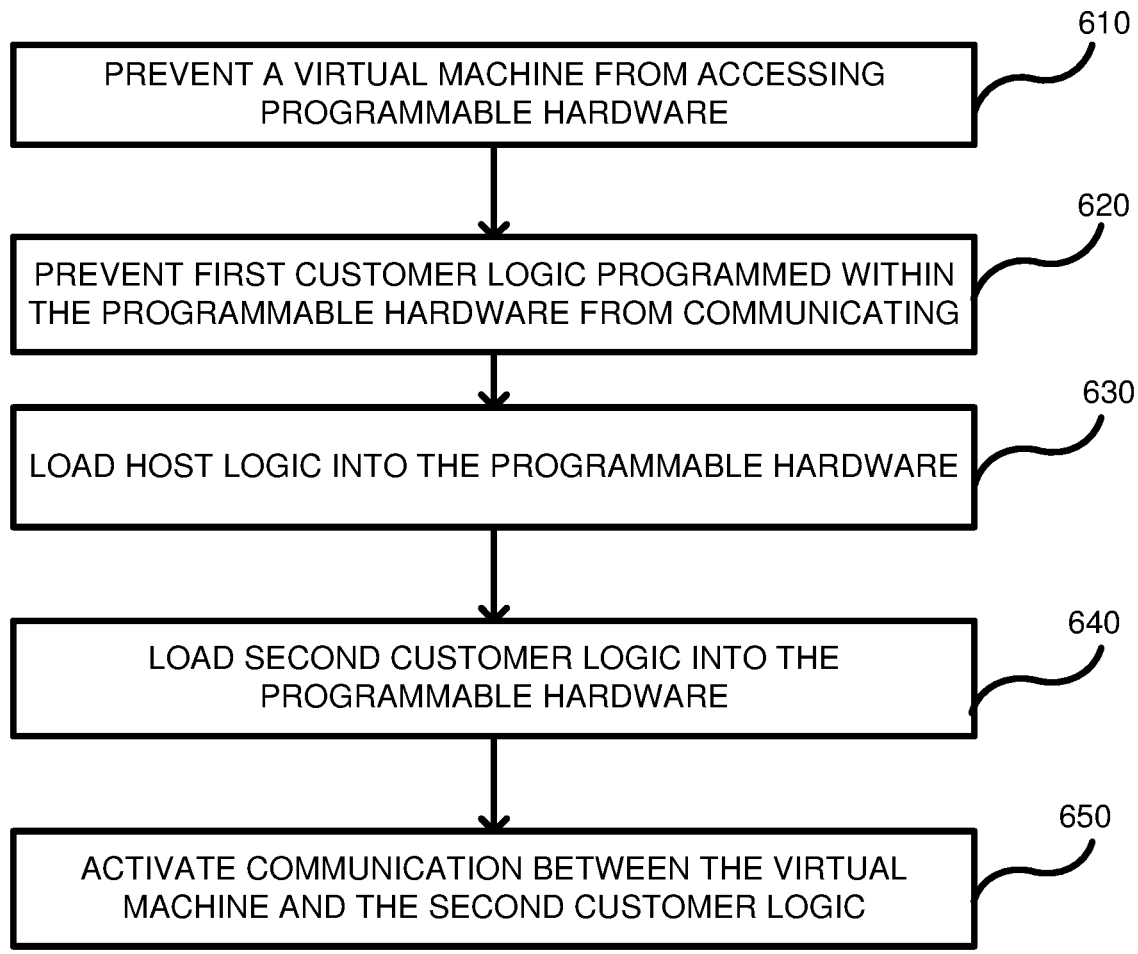
FIG. 6 is a flowchart according to yet another embodiment for reconfiguring the programmable hardware.

FIG. 6 is a flowchart of a method according to another embodiment. In process block 610, a virtual machine is prevented from accessing programmable hardware. Such prevention can include pausing the virtual machine or disabling a device driver. The pausing of the virtual machine can be controlled through a management hypervisor using available commands. Deactivation of the device driver can be accomplished by deletion of the device driver or clearing a bit to disable the device driver. At process block 620, first customer logic programmed within the programmable hardware can be prevented from communicating. For example, the first customer logic can be programmed in an FPGA and can be executing for a period of time. The management hypervisor can clear the first customer logic so as to prevent it from communicating. The cleared portion of the FPGA is to be reprogrammed in any event due to a request to load second customer logic into the FPGA. Other techniques can be used to prevent the first customer logic from communicating including disabling communication channels to the first customer logic, such as a PCIe bus, coupled to the first customer logic. In process block 630, host logic can be loaded into the programmable hardware. The host logic is typically in the same IC as the customer logic and is host wrapper logic used to allow a service provider to include protection in the multi-tenant environment, such as protection of the host server computer in which the IC is installed. In one example, the reconfigurable host logic 144 can be programmed into the FPGA (FIG. 1). In process block 640, second customer logic can be loaded into the programmable hardware. Thus, the same IC that includes the host logic can have a customer logic portion that is programmed therein. In some embodiments, process block 640 can be omitted. In process block 650, communications can be established between the virtual machine and the second customer logic. Previous preventions in process blocks 610, 620 can be removed or new communication channels can be established. For example, a new device driver (see 226, FIG. 2) can be installed on the virtual machine.

Figure 7:
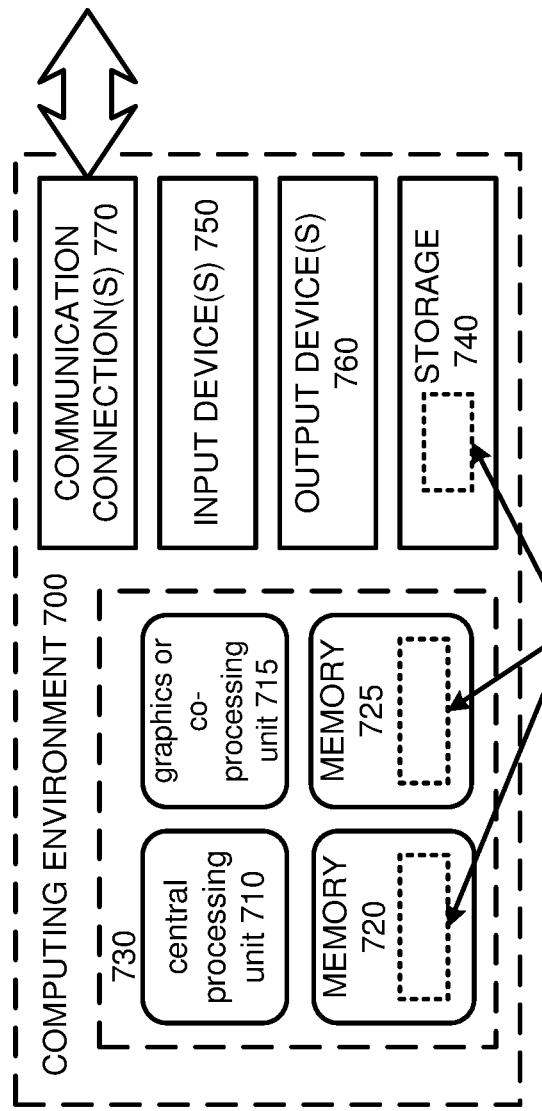
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. We therefore claim as our invention all that comes within the scope of these claims.

What is claimed is:

1. A method of re-configuring programmable hardware in a multi-tenant environment, the method comprising:

executing a virtual machine instance on a host server computer in the multi-tenant environment;

receiving, by a management software on the host server computer, a request from the virtual machine instance to load a new customer logic into the programmable hardware, the programmable hardware having a previous customer logic and a host logic programmed therein, the host logic comprising a static portion and a reconfigurable portion, the reconfigurable portion being programmed with a previous reconfigurable host logic;

based on the loading of the new customer logic into the programmable hardware being an authorized operation, and that a new reconfigurable host logic associated with the new customer logic is not loaded into the programmable hardware, disabling, by the management software, communications between the virtual machine instance and the previous customer logic in the programmable hardware, and preventing the previous customer logic from communicating with another component in the host server computer while communications between the virtual machine instance and the static portion of the host logic within the programmable hardware are maintained;

loading, by the management software, the new reconfigurable host logic into the programmable hardware to program the reconfigurable portion of the host logic with the new reconfigurable host logic to replace the previous reconfigurable host logic;

loading, by the management software, the new customer logic into the programmable hardware to replace the previous customer logic, wherein the host logic restricts communication between the new customer logic and a component of a hardware platform including the programmable hardware; and enabling, by the management software, communications between the virtual machine instance and the new customer logic in the programmable hardware.

2. The method of claim 1, wherein the disabling communications between the virtual machine instance and the previous customer logic includes pausing the virtual machine instance until the new reconfigurable host logic is loaded within the programmable hardware.

3. The method of claim 1, wherein the disabling communications between the virtual machine instance and the previous customer logic includes disabling a device driver within the virtual machine instance.

4. The method of claim 1, wherein the new reconfigurable host logic is provided by a service provider of the multi-tenant environment.

5. The method of claim 1, wherein the preventing the previous customer logic within the programmable hardware from communicating with another component in the host server computer includes clearing the previous customer logic from the programmable hardware.

6. The method of claim 1, wherein the programmable hardware is a Field Programmable Gate Array (FPGA).

7. The method of claim 1, wherein the previous reconfigurable host logic in the programmable hardware restricts the previous customer logic's access to the component of the hardware platform; and wherein the previous reconfigurable host logic is deactivated when the new reconfigurable host logic is loaded to replace the previous reconfigurable host logic.

8. The method of claim 1, wherein the component of the hardware platform includes one of: configuration resources, physical interfaces, hard macros, or peripherals of the hardware platform.

9. The method of claim 1, wherein the communications between the virtual machine instance and the new customer logic are performed via an interconnect; and
   wherein the host logic prevents the new customer logic from directly controlling signaling on to the interconnect.

10. The method of claim 9, where the host logic performs bus transactions on the interconnect for the communications between the virtual machine instance and the new customer logic.

11. The method of claim 1, wherein the host logic controls a configuration access port such that the new customer logic is loaded into the programmable hardware only via the configuration access port.

12. The method of claim 1, wherein the communications between the virtual machine instance and the new customer logic are enabled based on the host logic and the new customer logic becoming operational in the programmable hardware.

13. The method of claim 1, wherein the static portion of the host logic is configured only when the host server computer is reset or power-cycled.

14. The method of claim 1, wherein the new customer logic is part of a configurable hardware image (CHI) to be loaded into the programmable hardware; and
   wherein the CHI include metadata that associates the new reconfigurable host logic with the new customer logic.

15. The method of claim 14, wherein the request includes an identifier of the CHI; and
   wherein the new reconfigurable host logic is identified and loaded based on the identifier of the CHI and the metadata of the CHI.

16. The method of claim 1, further comprising: determining that the virtual machine instance is authorized to load the new customer logic in the programmable hardware.

17. A non-transitory computer-readable storage medium including instructions that upon execution cause a computer system to:
   receive, from a virtual machine executing on a host server computer of a multi-tenant environment, a request to load a new customer logic into programmable hardware, the programmable hardware having a previous customer logic and a host logic programmed therein, the host logic comprising a static portion and a reconfigurable portion, the reconfigurable portion being programmed with a previous reconfigurable host logic;
   based on the loading of the new customer logic into the programmable hardware being an authorized operation, and that a new reconfigurable host logic associated with the new customer logic is not loaded into the programmable hardware, prevent communication between the virtual machine and at least a portion of the programmable hardware loaded with the previous customer logic while communication between the virtual machine and the static portion of the host logic is maintained;
   load the new reconfigurable host logic into the programmable hardware to program the reconfigurable portion of the host logic with the new reconfigurable host logic to replace the previous reconfigurable host logic;
   load the new customer logic into the programmable hardware to replace the previous customer logic, wherein the host logic restricts communication between the new customer logic and a component of a hardware platform including the programmable hardware; and
   activate communication between the virtual machine and the at least a portion of the programmable hardware loaded with new customer logic.

18. The non-transitory computer-readable storage medium of claim 17, wherein the preventing communication between the virtual machine and the at least a portion of the programmable hardware includes modifying a device driver associated with the virtual machine.

19. The non-transitory computer-readable storage medium of claim 17, wherein the communication between the virtual machine and the at least a portion of the programmable hardware is activated after the host logic is loaded into the programmable hardware.

20. The non-transitory computer-readable storage of claim 17, wherein the activating communication includes loading a device driver within the virtual machine that establishes a communication channel with the new customer logic in the at least a portion of the programmable hardware.

21. The non-transitory computer-readable storage medium of claim 17, further including instructions that upon execution cause the computer system to determine that the virtual machine is authorized to load the new customer logic in the programmable hardware.

22. The non-transitory computer-readable storage medium of claim 17, wherein the preventing communication between the virtual machine and at least a portion of the programmable hardware loaded with the previous customer logic includes pausing the virtual machine until the new reconfigurable host logic is loaded within the programmable hardware.

23. An apparatus, comprising:
   a host server computer having a processor configured to execute a hypervisor and a virtual machine instance, wherein the host server computer is controlled by a user of a service provider;
   a programmable Integrated Circuit (IC) within the host server computer, the programmable IC configured to have a host logic programmed therein, wherein the host logic is controlled by the service provider and comprises a static portion and a reconfigurable portion, the reconfigurable portion being programmed with a first reconfigurable host logic;
   wherein the programmable IC is further configured to have a first customer logic programmed therein, wherein the host logic restricts communication between the first customer logic and a component of a hardware platform including the programmable IC; and
   wherein the host server computer is operable to:
      receive, by the host server computer, a request from the virtual machine instance to load a second customer logic into the programmable IC in place of the first customer logic;
      based on the loading of the second customer logic into the programmable IC being an authorized operation, and that a second reconfigurable host logic associated with the second customer logic is not loaded into the programmable IC, pause a first application in the virtual machine instance to prevent the first application from communicating with the first customer logic in the programmable IC;
      prevent communication from the first customer logic while communication between a second application in the virtual machine instance and the static portion of the host logic within the programmable IC is maintained;

load the second reconfigurable host logic into the reconfigurable portion of the host logic to replace the first reconfigurable host logic;

load the second customer logic into the programmable IC to replace the first customer logic, wherein the host logic restricts communication between the second customer logic and the component of the hardware platform; and enable communication between the first application in the virtual machine instance and the second customer logic in the programmable IC.

24. The apparatus of claim 23, wherein the pausing of the first application in the virtual machine instance is controlled by the hypervisor executing on the host server computer.

25. The apparatus of claim 23, wherein the first application includes an application driver; and wherein the second application includes a management driver.

26. The apparatus of claim 23, wherein the host server computer is configured to: determine that the virtual machine instance is authorized to load the second customer logic in the programmable hardware.

* * * * *

UNITED STATES PATENT AND TRADEMARK OFFICE
CERTIFICATE OF CORRECTION

PATENT NO. : 10,860,357 B1  
APPLICATION NO. : 15/645624  
DATED : December 8, 2020  
INVENTOR(S) : Robert Michael Johnson et al.

Page 1 of 1

It is certified that error appears in the above-identified patent and that said Letters Patent is hereby corrected as shown below:

On the Title Page

Item (54) TITLE:  
Delete: "SECURE RECONFIGURING PROGRAMMABLE HARDWARE WITH HOST LOGIC COMPRISING A STATIC PORTION AND A RECONFIGURABLE PORTION"  
Insert: --SECURE RECONFIGURING OF PROGRAMMABLE HARDWARE WITH HOST LOGIC COMPRISING A STATIC PORTION AND A RECONFIGURABLE PORTION--

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*